(12) United States Patent
Mukhopadhyay et al.

(10) Patent No.: US 8,631,064 B2
(45) Date of Patent: Jan. 14, 2014

(54) UNIFIED MANAGEMENT OF A HARDWARE INTERFACE FRAMEWORK

(75) Inventors: Anirban Mukhopadhyay, Kolkata (IN); Partha Protim Porel, Kolkata (IN)

(73) Assignee: LSI Corporation, Milpitas, CA (US)

( * ) Notice: Subject to any disclaimer, the term of this patent is extended or adjusted under 35 U.S.C. 154(b) by 1160 days.

(21) Appl. No.: 11/705,852

(22) Filed: Feb. 13, 2007

(65) Prior Publication Data

US 2008/0162683 A1    Jul. 3, 2008

(30) Foreign Application Priority Data

Dec. 27, 2006    (IN) .......................... 00007.00049IN1

(51) Int. Cl.
*G06F 15/16*    (2006.01)
*G06F 3/00*    (2006.01)

(52) U.S. Cl.
USPC .......................................... 709/202; 719/316

(58) Field of Classification Search
USPC ................. 709/223, 224, 201–203, 225–227;
719/316, 313–315, 317–318
See application file for complete search history.

(56) References Cited

U.S. PATENT DOCUMENTS

| | | | |
|---|---|---|---|
| 5,615,344 A | 3/1997 | Corder | |
| 5,632,027 A | 5/1997 | Martin et al. | |
| 5,922,062 A | 7/1999 | Evoy | |
| 6,108,712 A | 8/2000 | Hayes, Jr. | |
| 6,176,883 B1 * | 1/2001 | Holloway et al. | 709/223 |
| 6,209,023 B1 | 3/2001 | Dimitroff et al. | |
| 6,311,232 B1 | 10/2001 | Cagle et al. | |
| 6,336,152 B1 | 1/2002 | Richman et al. | |
| 6,473,748 B1 | 10/2002 | Archer | |
| 6,558,201 B1 | 5/2003 | Begley et al. | |
| 6,658,465 B1 * | 12/2003 | Touboul | 709/223 |
| 6,886,059 B2 | 4/2005 | Smith et al. | |
| 6,934,769 B2 | 8/2005 | Smith | |
| 7,089,390 B2 | 8/2006 | Hemsing et al. | |
| 7,111,304 B2 * | 9/2006 | Hand et al. | 719/315 |
| 7,191,404 B2 * | 3/2007 | Barker et al. | 715/760 |
| 7,383,552 B2 * | 6/2008 | Hudis et al. | 719/316 |
| 7,580,994 B1 * | 8/2009 | Fiszman et al. | 709/223 |
| 7,587,421 B2 * | 9/2009 | Bonilla et al. | 1/1 |
| 2002/0147764 A1 * | 10/2002 | Krupczak | 709/202 |
| 2004/0230965 A1 * | 11/2004 | Okkonen | 717/168 |
| 2005/0055398 A1 * | 3/2005 | Olson et al. | 709/200 |
| 2006/0069717 A1 * | 3/2006 | Mamou et al. | 709/203 |
| 2006/0095562 A1 * | 5/2006 | Agarwal et al. | 709/224 |

(Continued)

OTHER PUBLICATIONS

Woithe, Aug. 13, 2002, "Bluefin" a common Interface for SAN Management, SNIA, Storage Networking Industry Association Disk Resource Management Work Group (SNIA-DRM; V1.0, pp. 1-5).*

*Primary Examiner* — Chirag R Patel
(74) *Attorney, Agent, or Firm* — Raj Abhyanker, P.C.

(57) ABSTRACT

A method and/or a system of unified management of a hardware interface framework is disclosed. In one embodiment, a method of the hardware interface framework includes applying to a client interface module with a generic agent module agnostic to a change in a device coupled to the hardware interface framework and a change in a management module and communicating a management data of the management module between the client interface module and a server interface module coupled to the device using the generic agent module. The method may also include synchronously communicating a request data of the management module to collect a response data of the device and asynchronously communicating an event data of an adapter module to the management module.

13 Claims, 8 Drawing Sheets

(56) References Cited

U.S. PATENT DOCUMENTS

2007/0260629 A1* 11/2007 Tseitlin et al. ............... 707/102
2008/0008116 A1* 1/2008 Buga et al. .................... 370/328
2008/0066060 A1* 3/2008 Sonderegger ................. 717/140
2008/0098454 A1* 4/2008 Toh ................................. 726/1

* cited by examiner

UNIFIED MANAGEMENT OF A HARDWARE INTERFACE FRAMEWORK

FIELD OF TECHNOLOGY

This disclosure relates generally to the technical fields of hardware, and in one embodiment, to a method and a system of unified management of a hardware interface framework.

BACKGROUND

A hardware device (e.g., a raid controller in SCSI, IDE, 1030, SAS, and/or SASIR) may need several management applications to support functionalities of the hardware device. For example, the hardware device may need a simple network management protocol (e.g., SNMP in short, which is a Layer 7 and/or an application layer protocol that may be used by a network management system to monitor the hardware device for conditions that warrant an administrative attention) support, a common information model (e.g., CIM in short, which represents and/or manages elements and/or information being managed) support, and other management application support.

Thus, the SNMP (e.g., a small network management protocol) may need to be implemented for each of a SNMP agent which resides in the hardware device. Also, the CIM (e.g., the common information model) may need to be implemented for a CIM provider which resides in the hardware device. Furthermore, the other management application may need to be implemented for a proxy of the other management application. Thus, a memory footprint may be high for the SNMP, the CIM, and the other management application running on the hardware device.

In addition, each of the SNMP agent, the CIM provider, and the proxy of the other management application (e.g., where the SNMP agent, the CIM provider, and the proxy of the other management application may maintain different data structures for caching) may interface with the hardware device in its own way (e.g., there may be no uniform scheme for data communication between the SNMP agent, the CIM provider, and the proxy and the hardware device). Furthermore, any change in the SNMP, the CIM, and/or the other management application may require an update for every single member of the SNMP agent, the CIM provider, and the proxy of the other management application (e.g., thus incurring a high cost, time, and/or manpower).

SUMMARY OF THE DISCLOSURE

A method and/or a system of unified management of a hardware interface framework is disclosed. In one aspect, a method of a hardware interface framework includes applying to a client interface module with a generic agent module (e.g., which may include a generic simple network management protocol (SNMP) agent module, a generic common information model (CIM) agent module, and/or a generic common management provider interface (CMPI) agent module) agnostic to a change in a device coupled to the hardware interface framework and the change in a management module (e.g., a SNMP management module, a CIM management module, and/or a CMPI management module) of the hardware interface framework.

The method also includes communicating a management data (e.g., which may be a request data of the management module, a response data of the device, and/or an event data of the device) of the management module between the client interface module and a server interface module coupled to the device using the generic agent module (e.g., which may to reside in a repository of the hardware interface framework).

The method may include synchronously communicating the request data of the management module to collect the response data of the device (e.g., where the request data and the response data are communicated between the client interface module and the server interface module in a base packet structure based on a class hierarchy). The method may further include routing the request data to an adapter module using a broker module which finds the adapter module based on an interface map of the hardware interface framework.

In addition, the method may further include instantiating a service adapter module defined in a configuration module of the hardware interface framework when the request data is processed through the adapter module, and decoding the request data to forward to the service adapter module. Moreover, the method may include processing the request data through the service adapter module and loading a data collector module using a data collector loader module based on the request data. Moreover, the method includes collecting the response data of the device using the data collector module.

The method may also include generating the event data based on the change in the device using the service adapter module which bases the interface map to communicate the event data to the adapter module. Furthermore, the method may include asynchronously communicating the event data of the adapter module to the management module (e.g., where the event data is communicated between the client interface module and the server interface module in the base packet structure based on the class hierarchy).

In another aspect, a method of a hardware interface framework includes synchronously communicating a management data between a client interface module and a server interface module based on a generic agent module agnostic to a change in a device coupled to the server interface module and the change in a management module coupled to the client interface module. The method also includes asynchronously communicating an event data of the device to the management module based on the change in the device. The method may also include performing the communicating the management data and the communicating the event data in a base packet structure based on a class hierarchy.

In yet another aspect, a system of a hardware interface framework includes a client interface module to process a management data of a management module using a generic agent module agnostic to a change in a device coupled to the hardware interface framework and the change in the management module of the hardware interface framework. The system also includes a server interface module to access the device using layered adapter modules corresponding to the generic agent module based on the management data (e.g., where the management data includes at least a request data of the management module, a response data of the device, and an event data of the device).

The system may also include an adapter module of the layered adapter module to instantiate a service adapter module (e.g., which may fetch the response data from a data collector module and/or a different service adapter module) matching a particular communication protocol of the request data and process the request data to the service adapter module. The system may further include a data collector loader module to load the data collector module only if the data collector module has not already been loaded. Moreover, the system may include an interface map to enable routing of the request data to the adapter module and to the service adapter module.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and/or a system of unified management of a hardware interface framework is disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
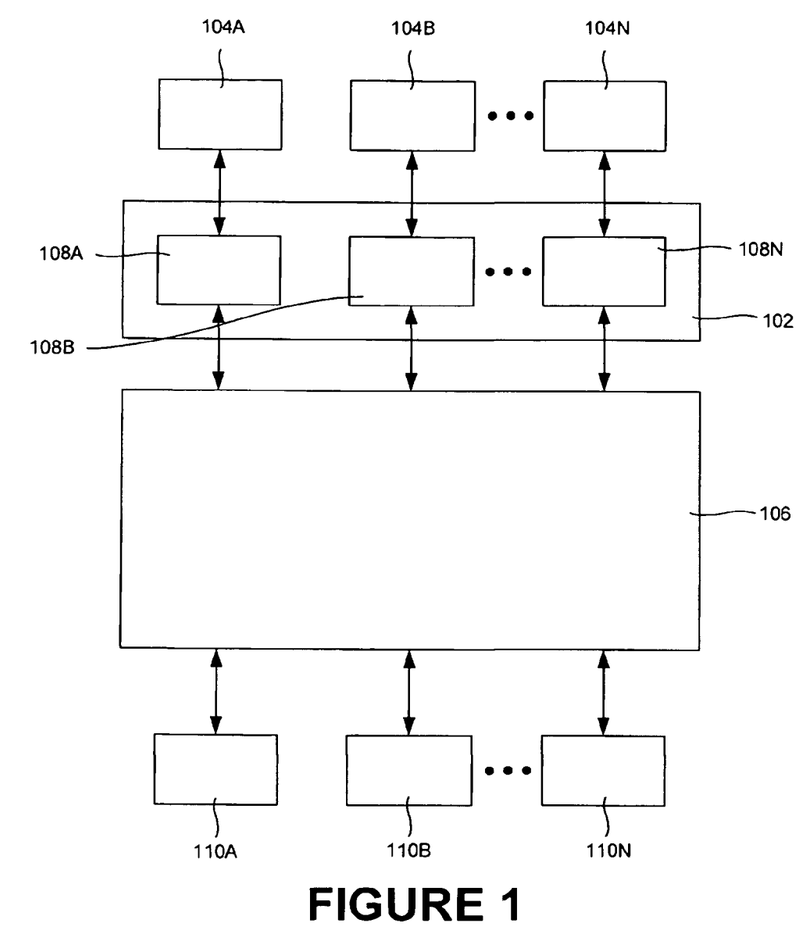
FIG. 1 is a system view of a client interface module communicating with a management module and a server interface module, according to one embodiment.

In one embodiment, a method of a hardware interface framework includes applying to a client interface module (e.g., the client interface module 102 of FIG. 1) with a generic agent module (e.g., the generic agent module 108 of FIG. 1) agnostic to a change in a device (e.g., the device 110 of FIG. 1) coupled to the hardware interface framework and a change in a management module (e.g., the management module 104 of FIG. 1) of the hardware interface framework and communicating a management data (e.g., the response data, request data, etc.) of the management module (e.g., the management module 104 of FIG. 1) between the client interface module (e.g., the client interface module 108 of FIG. 1) and a server interface module (e.g., the server interface module 106 of FIG. 1) coupled to the device (e.g., the device 110 of FIG. 1) using the generic agent module (e.g., the generic agent module 108 of FIG. 1).

In another embodiment, a method of a hardware interface framework includes synchronously communicating a management data (e.g., a request data, a response data, etc.) between a client interface module (e.g., the client interface module 102 of FIG. 1) and a server interface module (e.g., the server interface module 106 of FIG. 1) based on a generic agent module (e.g., the generic agent module 108 of FIG. 1) agnostic to the change in the device (e.g., the device 110 of FIG. 1) coupled to the server interface module (e.g., the server interface module 106 of FIG. 1) and a change in the management module (e.g., the management module 104 of FIG. 1) coupled to the client interface module (e.g., the client interface module 102 of FIG. 1) and asynchronously communicating an event data (e.g., the event data 410 of FIG. 4) of the device to the management module (e.g., the management module 104 of FIG. 1) based on the change in the device (e.g., the device 110 of FIG. 1).

In yet another embodiment, a system of a hardware interface framework includes a client interface module (e.g., the client interface module 102 of FIG. 1) to process a management data (e.g., a request data, a response data, etc.) of a management module (e.g., the management module 104 of FIG. 1) using a generic agent module (e.g., the generic agent module 108 of FIG. 1) agnostic to a change in a device (e.g., the device 110 of FIG. 1) coupled to the hardware interface framework and the change in the management module (e.g., the management module 104 of FIG. 1) of the hardware interface framework and a server interface module (e.g., the server interface module 106 of FIG. 1) to access the device (e.g., the device 110 of FIG. 1) using layered adapter modules corresponding to the generic agent module (e.g., the generic agent module 108 of FIG. 1) based on the management data (e.g., the management data may include the request data (e.g., the request data 406 of FIG. 4) of the management module (e.g., the management module 104 of FIG. 1), the response data (e.g., the response data 408 of FIG. 4) of the device (e.g., the device 110 of FIG. 1), and an event data (e.g., the event data 410 of FIG. 4) of the device (e.g., the device 110 of FIG. 1).

FIG. 1 is a system view of a client interface module 102 communicating with a management module 104 and a server interface module 106, according to one embodiment. Particularly, FIG. 1 illustrates the client interface module 102, the management module 104, the server interface module 106, a generic agent module 108 and a device 110, according to one embodiment.

The client interface module 102 may encode and/or communicate one or more protocol specific requests of the management module 104, and/or may communicate one or more protocol specific responses to a client. The management module 104 may allow multiple parties to exchange management information about managed elements (e.g., hardware devices coupled to the management module 104) and/or may also provide means to actively control and/or manage the managed elements. The server interface module 106 may collect hardware information of the managed elements and/or on receiving an alert from any of the managed elements, may broadcast the alert to the management module 104.

The generic agent module 108 may reside in a repository of a hardware interface framework. The device 110 may be a computer and/or a physical part of the computer that may include a digital circuitry, as distinguished from a computer software that may be executed within a hardware. The generic agent module 108 of the client interface module 102 may interact with the management module 10 and/or the server interface module 106. The server interface module 106 may interact with the device 110.

Furthermore, a generic agent module (e.g., the generic agent module 108) agnostic to a change in a device (e.g., device 110) coupled to a hardware interface framework and a change in a management module (e.g., the management module 104) of the hardware interface framework may be applied to a client interface module (e.g., the client interface module 102). Also, a management data of the management module may be communicated between the client interface module and a server interface module (e.g., the server interface module 106) coupled to the device using the generic agent module.

In addition, the management data (e.g., the response data, the request data, the event data, etc.) may be synchronously communicated between the client interface module and the server interface module based on the generic agent module agnostic to the change in the device coupled to the server interface module and the change in the management module coupled to the client interface module. Also, event data (e.g., the event data 410 of FIG. 4) of the device may be asynchronously communicated to the management module based on the change in the device.

Moreover, management data (e.g., response data, request data, event data, etc.) of the management module may be processed using the generic agent module agnostic to the change in the device coupled to the hardware interface framework and the change in the management module of the hardware interface framework. Also, the device may be accessed through the server interface module using layered adapter modules (e.g., adapter modules, service adapter modules, etc.) corresponding to the generic agent module based on the management data.

Figure 2:
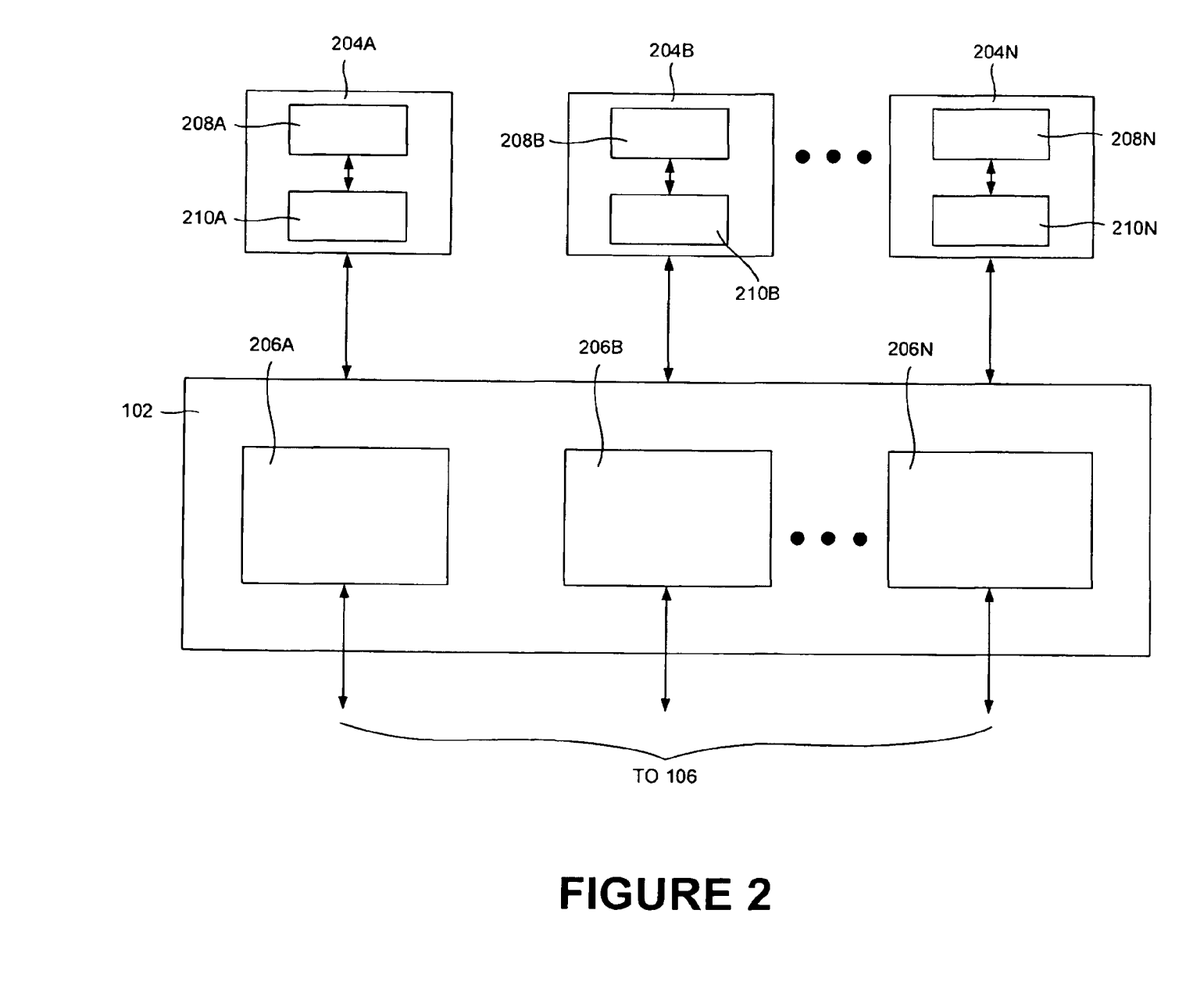
FIG. 2 is an exploded view of the client interface module of FIG. 1, according to one embodiment.

FIG. 2 is an exploded view of the client interface module 102 of FIG. 1, according to one embodiment. Particularly, FIG. 2 illustrates the client interface module 102, a SNMP management module 204A, a CIM management module 204B, a CMPI management module 204N, a generic SNMP agent module 206A, a generic CIM agent module 206B, a generic CMPI agent module 206N, a SNMP manager 208A, a CIM manager 208B, a CMPI manager 208N, a SNMP service 210A, a CIMOM 210B and a CMPI service 210N, according to one embodiment.

The SNMP management module 204A may be a part of an internet protocol suite managing affordable, highly reliable networking technology. The CIM management module 204B may collect/manage required data from computer systems, operating systems, networks, middleware, services and/or storage system. The CMPI management module 204N may define a C-based programming interface to be used by management servers and their resource-specific extensions. The generic SNMP agent module 206A may have local knowledge of management information and may translate the information into a form compatible with the SNMP.

The generic CIM agent module 206B may translate information into a form compatible with the CIM and/or may provide a proxy for various CIMOMs. The generic CMPI agent module 206N may decode information into a form compatible with the CMPI and/or a proxy of the CMPI may be same across CIMOMs coupled to the CMPI. The SNMP manager 208A may be a part of the SNMP management module 204A and/or may communicate request data for management operations on behalf of an administrator and/or an application and/or receive traps (e.g., event data) from agents and/or proxies as well.

The CIM manager 208B may be a part of the CIM management module 204B and/or may provide mapping techniques for data interchange and/or managing schemas for systems, networks, applications and devices and/or new schemas may be added. The CMPI manager 208N may be an application layer of CMPI management module 204N. The SNMP service 210A may provide information about a management of specific functionality pertaining to the management module 204A.

The CIMOM 210B may include functions of a CIM server, CIM repositories and/or CIM providers and/or tools to operate the CIM server. The CMPI service 210N may be a part of the CMPI management module 204N. The CMPI service 210N may be a part of the CMPI management module 204N. The generic SNMP agent module 206A of the client interface module 102 may communicate with the SNMP service 210A of the SNMP management module 204A. The SNMP manager 208A may communicate with the SNMP service 210A of the SNMP management module 204A.

Furthermore, a generic agent module (e.g., the generic agent module 108) may include a generic SNMP agent module (e.g., the SNMP agent module 206A), a generic CIM agent module (e.g., the generic CIM agent module 206B), and/or a generic CMPI agent module (e.g., the generic CMPI agent module 206N). In addition, a management module (e.g., the management module 104 of FIG. 1) may include a SNMP management module (e.g., the SNMP management module 204A), a CIM management module (e.g., the CIM management module 204B), and/or a CMPI management module (e.g., the CMPI management module 204N).

Figure 3:
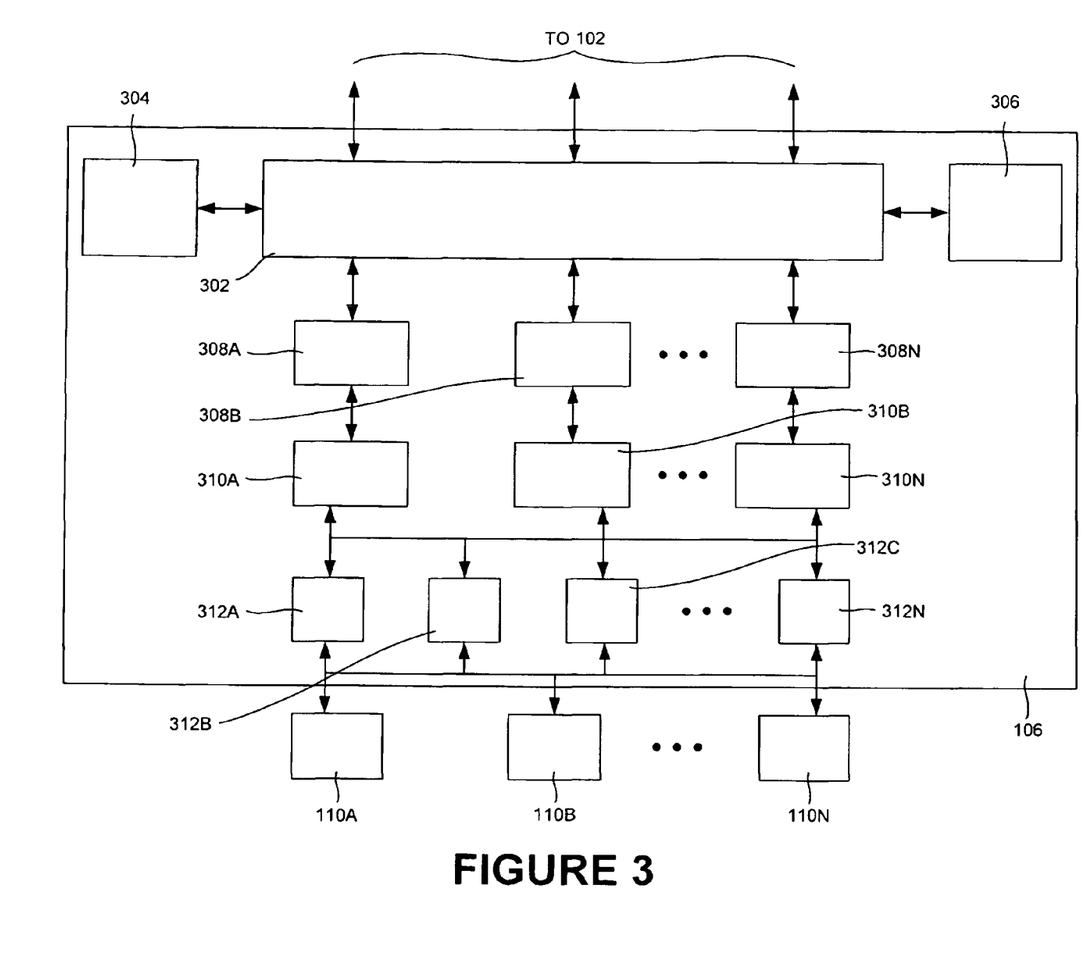
FIG. 3 is an exploded view of the server interface module of FIG. 1, according to one embodiment.

FIG. 3 is an exploded view of the server interface module 106, according to one embodiment. Particularly, FIG. 3 illustrates a broker module 302, a configuration module 304, an interface map 306, a SNMP adapter module 308A, a CIM adapter module 308B, a CMPI adapter module 308N, a SNMP service adapter module 310A, a CIM service adapter module 310B, a CMPI service adapter module 310N, a data collector module 312, according to one embodiment.

The broker module 302 may route request data to an adapter module based on the interface map 306 of the hardware interface framework. The configuration module 304 may arrange functional units according to their nature, number and/or chief characteristics that may affect functions and performances of the functional units. The interface map 306 may enable routing of the request data to the adapter module and/or to a service adapter module.

The SNMP adapter module 308A may allow classes to work together that normally may not due to incompatible interfaces through wrapping an interface of the SNMP adapter module 308A around that of an already existing class. The CIM adapter module 308B may match a particular communication protocol of the request data and/or process the request data to the service adapter. The CMPI adapter module 308N may be a dynamic component supporting a common C-based resource. The SNMP service adapter module 310A may fetch the response data from a data collector module to receive information about any changes in a device (e.g., a hardware device). The CMI service adapter module 310B may gather the request data from/by an appropriate data collector and return the response data (e.g., the result of the request data) to the protocol adapter layer.

The CMPI service adapter module 310N may decode the request data and/or fetch the response data from an appropriate data collector. The data collector module 312 may collect information and changes from the device 110. The broker module 302 of the server interface module 102 may interact with the client interface module 102, the configuration module 304, the interface map 306, the SNMP adapter module 308A, the CIM adapter module 308B and/or the CMPI adapter module 308N of the server interface module 106.

The SNMP adapter module 308A may interact with the SNMP service adapter module 310A. The CIM adapter module 308B may interact with the CIM service adapter module 310B. The CMPI adapter module 308N may interact with the CMPI service adapter module 310N. The SNMP service adapter module 310A, the CIM adapter service module 310B and the CMPI service adapter module 310N may interact with the data collector module 312. The data collector module 312 of the server interface module 106 may communicate with the device 110.

Figure 4:
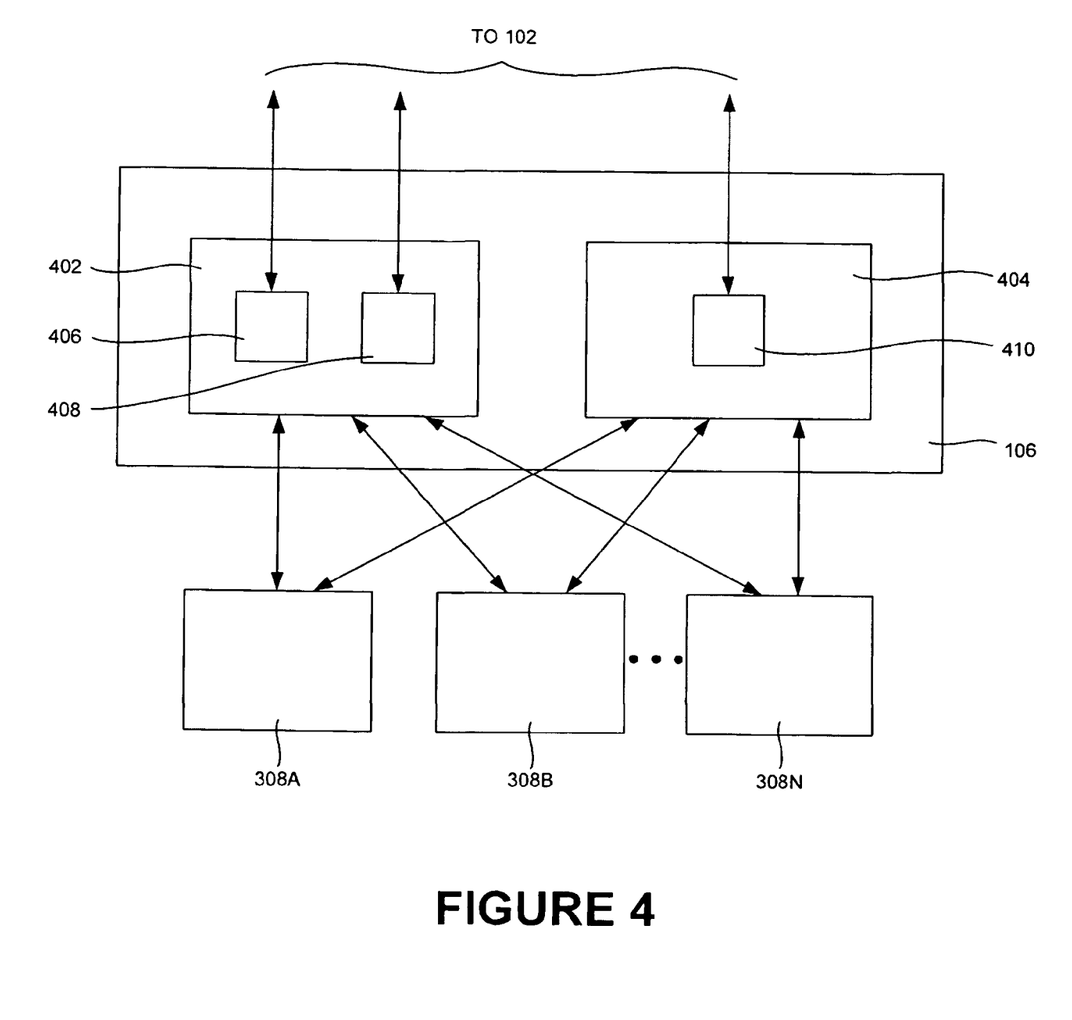
FIG. 4 is an exploded view of the broker module of FIG. 3, according to one embodiment.

Furthermore, a request data (e.g., the request data 406 of FIG. 4) may be routed to an adapter module (e.g., the SNMP adapter module 308A, CIM adapter module 308B, the CMPI adapter module 308N of FIGS. 3 and 4) using a broker module (e.g., the broker module 302) which finds the adapter module (e.g., the SNMP adapter module 308A, CIM adapter module 308B, and the CMPI adapter module 308N of FIGS. 3 and 4) based on an interface map 306 of a hardware interface framework.

Also, a service adapter module (e.g., the SNMP service adapter module 310A, the CIM service adapter module 310B, and the CMPI service adapter module 310N of FIG. 3) defined in a configuration module 304 of the hardware interface framework may be instantiated when the request data (e.g., the request data 406 of FIG. 4) is processed through the adapter module (e.g., the SNMP adapter module 308A, the CIM adapter module 308B, and the CMPI adapter module 308N of FIGS. 3 and 4).

In addition, the request data (e.g., the request data 406 of FIG. 4) may be processed through a service adapter module (e.g., the SNMP service adapter module 310A, the CIM service adapter module 310B, and the CMPI service adapter module 310N of FIG. 3). Also, the data collector module 312A-N may be loaded using a data collector loader module based on the request data (e.g., the request data 406 of FIG. 4). A response data (e.g., the response data 408 of FIG. 4) of the device (e.g., the device 110A-N of FIG. 1) may be collected using the data collector module 312A-N.

Also, an event data (e.g., the event data 410 of FIG. 4) based on the change in the device may be generated using the service adapter module (e.g., the SNMP service adapter module 310A, the CIM service adapter module 310B, and the CMPI service adapter module 310N of FIG. 3) which bases the interface map to communicate the event data to the adapter module. The adapter module may instantiate the service adapter module through matching a particular communication protocol of the request data to the service adapter. The service adapter module may fetch the response data from the data collector module and/or a different service adapter module. Moreover, the data collector loader module may load the data collector module only if the data collector module has not already been loaded. The interface map may enable routing of the request data to the adapter module and/or to the service adapter module.

FIG. 4 is an exploded view of the broker module 302, according to one embodiment. Particularly, FIG. 4 illustrates the SNMP adapter module 308A, the CIM adapter module 308B, the CMPI adapter module 308N, a request/response module 402, an event module 404, a request data 406, a response data 408 and an event data 410, according to one embodiment.

The request/response module 402 may communicate the request data 406 and/or the response data 408 between the client interface module 102 and the server interface module 106 in a base packet structure based on a class hierarchy. The event module 404 may process the event data 410 (e.g., and/or a trap data) from an adapter module, processes the event data 410, divide the event data into packets and forward the packets to the client interface module 102 along with a control tag.

The request data 406 may be any data received from the client interface module (e.g., client interface module 102 of FIG. 1).

The response data 408 may be data received by the client interface module 102 through acknowledgment by the request/response module. The event data 410 may indicate a change in a status of the device 110. The request/response module 402 may interact with the SNMP adapter module 308A, the CIM adapter module 308B and/or the CMPI adapter module 308N.

The event module 404 may interact with the SNMP adapter module 308A, the CIM adapter module 308B and/or the CMPI adapter module 308N. The request data 406 may interact with the client interface module 102. The response data 408 may interact with the client interface module 102. The event data 410 may interact with the client interface module 102.

Furthermore, a request data (e.g., the request data 406) of a management module (e.g., the management module 104) may be synchronously communicated to collect a response data (e.g., the response data 408) of a device (e.g., the device 110 of FIG. 1). Also, the request data and/or the response data may be communicated between a client interface module (e.g., the client interface module 102 of FIG. 1) and a server interface module (e.g., the server interface module 106 of FIG. 1) in a base packet structure based on a class hierarchy (e.g., as illustrated in an example embodiment of FIG. 5).

Moreover, the request data may be decoded to forward to a service adapter module (e.g., the SNMP service adapter module 310A, the CIM service adapter module 310B, and the CMPI service adapter module 310N of FIGS. 3 and 4). The request data may be processed through the service adapter module. The response data of the device may be collected using a data collector module (e.g., the data collector module 312 of FIG. 3).

In addition, an event data (e.g., the event data 410) may be generated using the service adapter module which bases an interface map (e.g., the interface map 306 of FIG. 3) to communicate the event data to the adapter module. The event data of the adapter module may be asynchronously communicated to the management module. Similarly, the event data of the device may be asynchronously communicated to the management module based on the change in the device.

Figure 5:
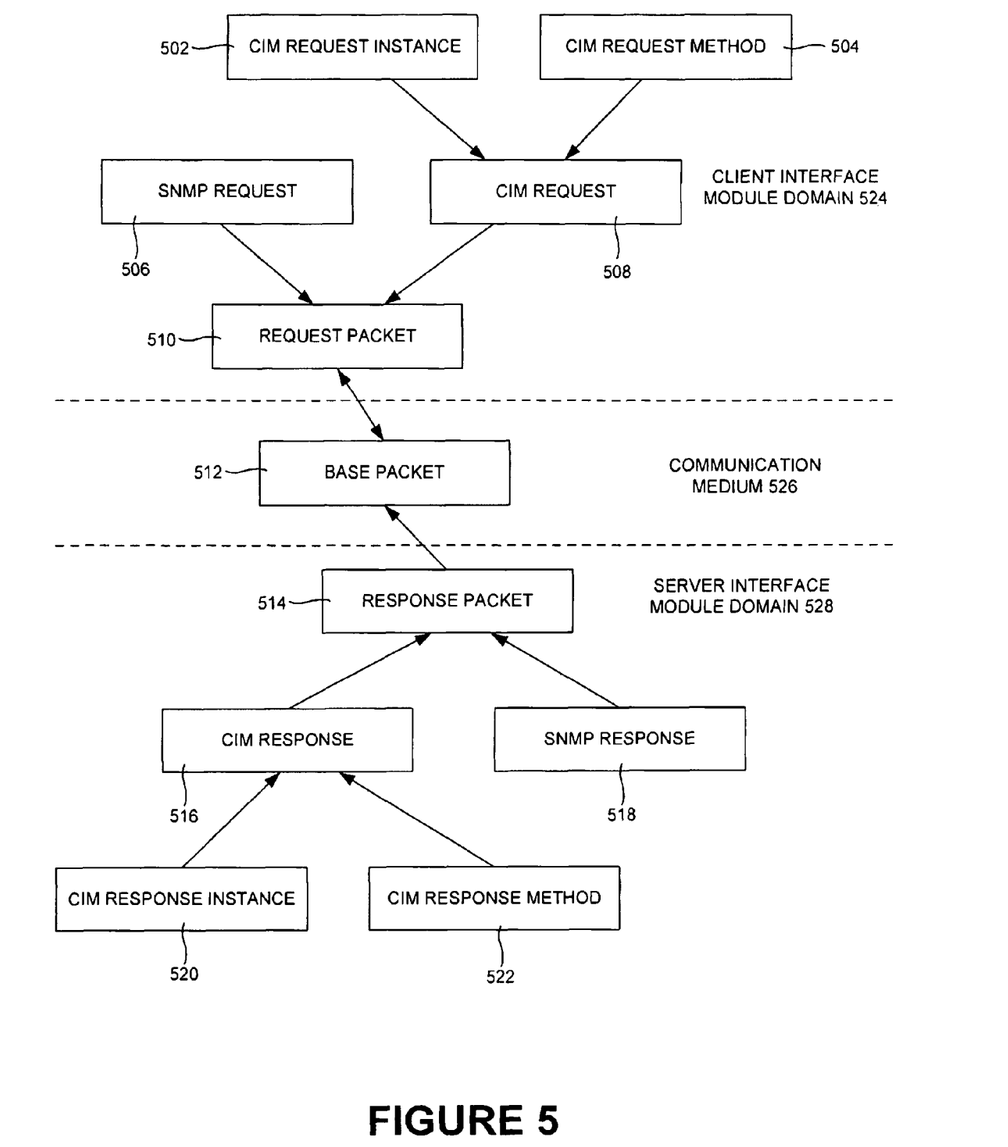
FIG. 5 is a hierarchy view of a base packet structure, according to one embodiment.

FIG. 5 is a hierarchy view of a base packet structure, according to one embodiment. Particularly, FIG. 5 illustrates a CIM request instance 502, a CIM request method 504, a SNMP request 506, a CIM request 508, a request packet 510, a base packet 512, a response packet 514, a CIM response 516, a SNMP response 518, a CIM response instance 520, a CIM response method 522, a client interface module domain 524, a communication medium 526 and a server interface module domain 528, according to one embodiment.

The CIM request instance 502 may request data not for a particular time but in future. The request method 504 may request for transfer of the data. The SNMP request 506 may transfer data from a destination to a client. The CIM request 508 may transfer the request data from the client to the destination. The request packet 510 may request for a packets missing among the total packets during a communication between the destination and the client (e.g., the source).

The base packet 512 may be an original data which may be divided into a number of packets along with the control tag with a course and/or the destination address attached. The response packet 514 may response for missing packets during the communication between the destination and the source. The CIM response 516 may transfer the response data from the client to the destination. The SNMP response 518 may transfer response data from the destination to the client.

The CIM request instance 502 may be the response data not for a particular time but in future. The CIM response method 522 may response to the request data. The client interface module domain 524 may manage a flow of the request data in the base packet structure based on a class hierarchy. The communication medium 526 may be a process of sharing information holding the base packet. The server interface module domain 528 may manage a flow of the response data in the base packet structure based on the class hierarchy.

In the example embodiment illustrated in FIG. 5, the base packet structure may perform communicating management data of the management module 104 between the client interface module domain 524 and the server interface module domain 528 based on a class of hierarchy. In addition, the base packet structure may perform communicating the event data 410 of the device 110 between the client interface module 102 and the server interface module 106 based on the class of hierarchy as illustrated in example embodiment of FIG. 5.

The base packet structure as illustrated in example embodiment of FIG. 5 may communicate the response data 408 of the management module 104 between the client interface module domain 524 and the server interface module domain 528 to collect the response data 408 from the server interface module 106 through the communication medium 526.

Furthermore, based on a class hierarchy structure (e.g., as illustrated in FIG. 5), a management data (e.g., the request data 406 and/or response data 408 of FIG. 4) and/or an event data (e.g., the event data 410) may be communicated in a base packet structure.

Figure 6:
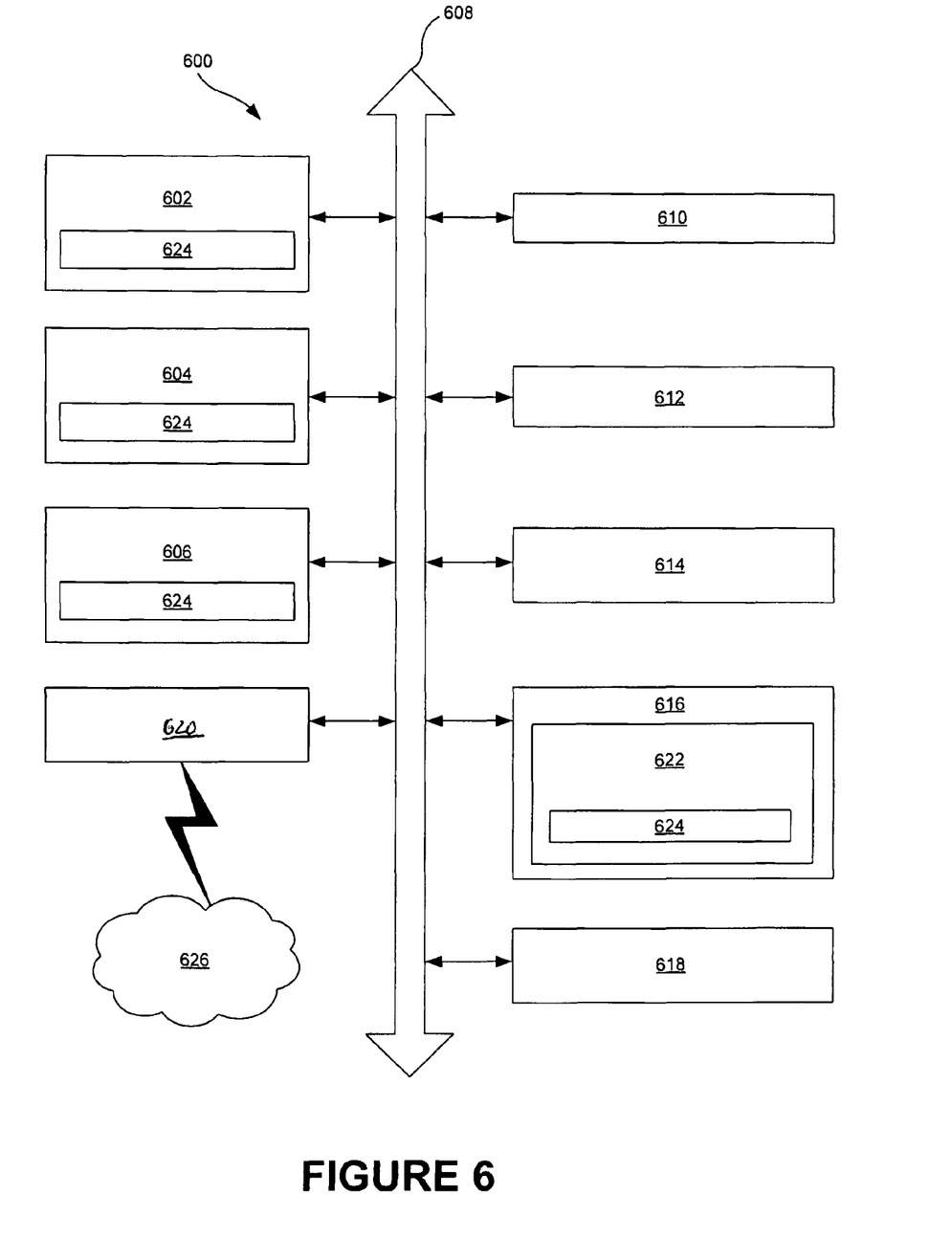
FIG. 6 is a diagrammatic system view of a data processing system in which any of the embodiments disclosed herein may be performed, according to one embodiment.

FIG. 6 is a diagrammatic representation of a data processing system capable of processing a set of instructions to perform any one or more of the methodologies herein, according to one embodiment. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal display (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies and/or functions described herein. The software 624 may also reside, completely and/or at least partially, within the main memory 604 and/or within the processor 602 during execution thereof by the computer system 600, the main memory 604 and the processor 602 also constituting machine-readable media.

The software 624 may further be transmitted and/or received over a network 626 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media.

Figure 7:
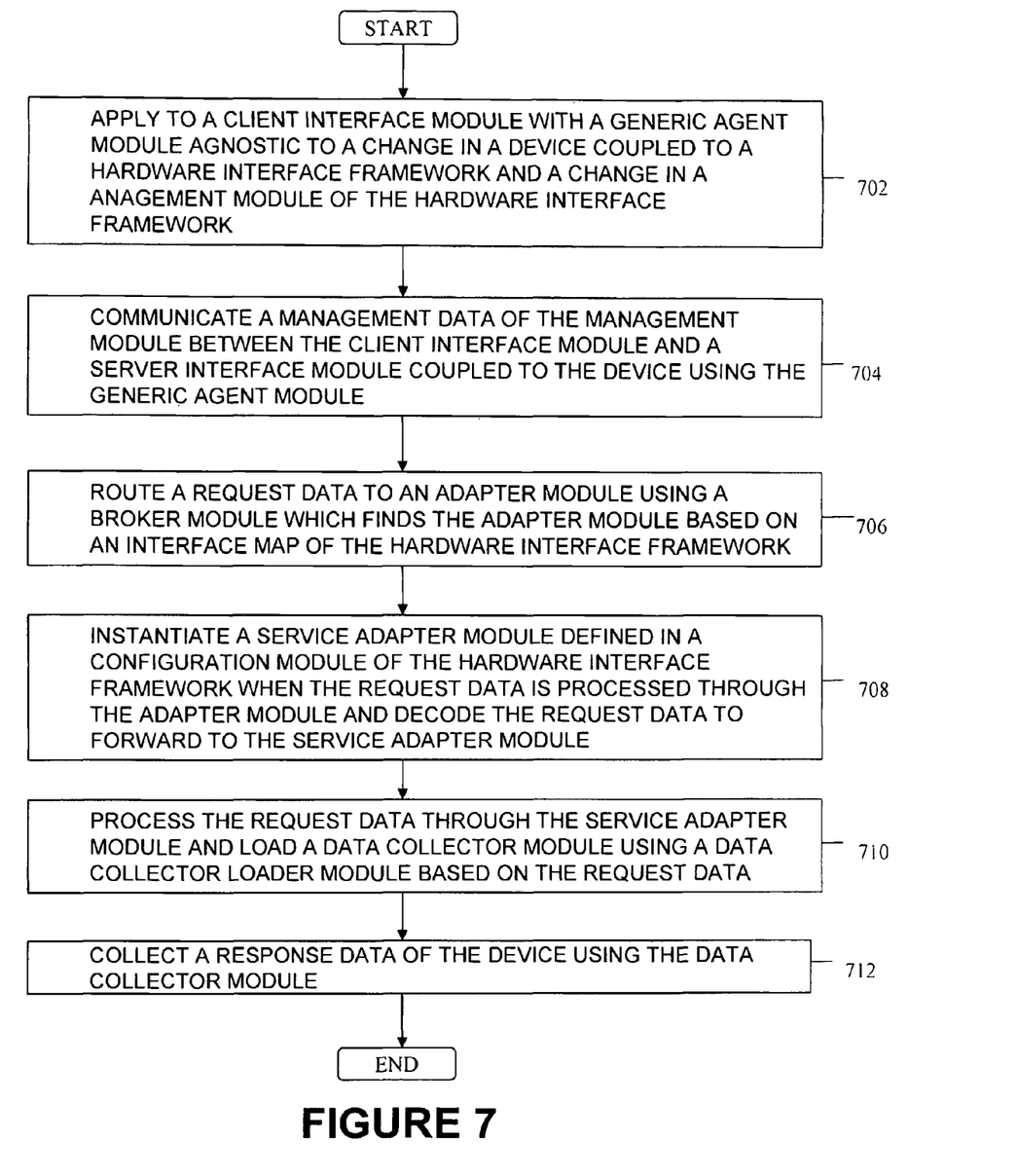
FIG. 7 is a process flow of processing a request data and collecting a response data, according to one embodiment.

FIG. 7 is a process flow of processing a request data (e.g., the request data 406 of FIG. 4) and collecting a response data (e.g., response data 408 of FIG. 4), according to one embodiment. In operation 702, a generic agent module (e.g., the generic agent module 108 of FIG. 1) agnostic to a change in a device (e.g., the device 110 of FIG. 1) coupled to a hardware interface framework and a change in a management module (e.g., the management module 104 of FIG. 1) of the hardware interface framework may be applied to a client interface module (e.g., the client interface module 102 of FIG. 1). In operation 704, a management data (e.g., the request data 406 and/or response data 408 of FIG. 4) of the management module (e.g., the management module 104 of FIG. 1) may be communicated between the client interface module and a server interface module (e.g., the server interface module 106 of FIG. 1) coupled to the device using the generic agent module.

In operation 706, a request data (e.g., the request data 406 of FIG. 4) to an adapter module (e.g., a SNMP adapter module 308A, a CIM adapter module 308B, and the CMPI adapter module 308N of FIGS. 3 and 4) may be routed using a broker module (e.g., the broker module 302 of FIGS. 3 and 4) which finds the adapter module (e.g., the SNMP adapter module 308A, the CIM adapter module 308B, and the CMPI adapter module 308N of FIGS. 3 and 4) based on an interface map (e.g., the interface map 306 of FIG. 3) of the hardware interface framework. In operation 708, a service adapter module (e.g., a SNMP service adapter module 310A, a CIM service adapter module 310B, and CMPI service adapter module 310N of FIG. 3) defined in a configuration module (e.g., the configuration module 304 of FIG. 3) of the hardware interface framework when the request data is processed may be instantiated through the adapter module and decode the request data to forward to the service adapter module.

In operation 710, the request data may be processed through the service adapter module and load a data collector module (e.g., the data collector module 312A-N of FIG. 3) using a data collector loader module based on the request data. In operation 712, a response data (e.g., the response data 408 of FIG. 4) of the device may be collected using the data collector module.

Figure 8:
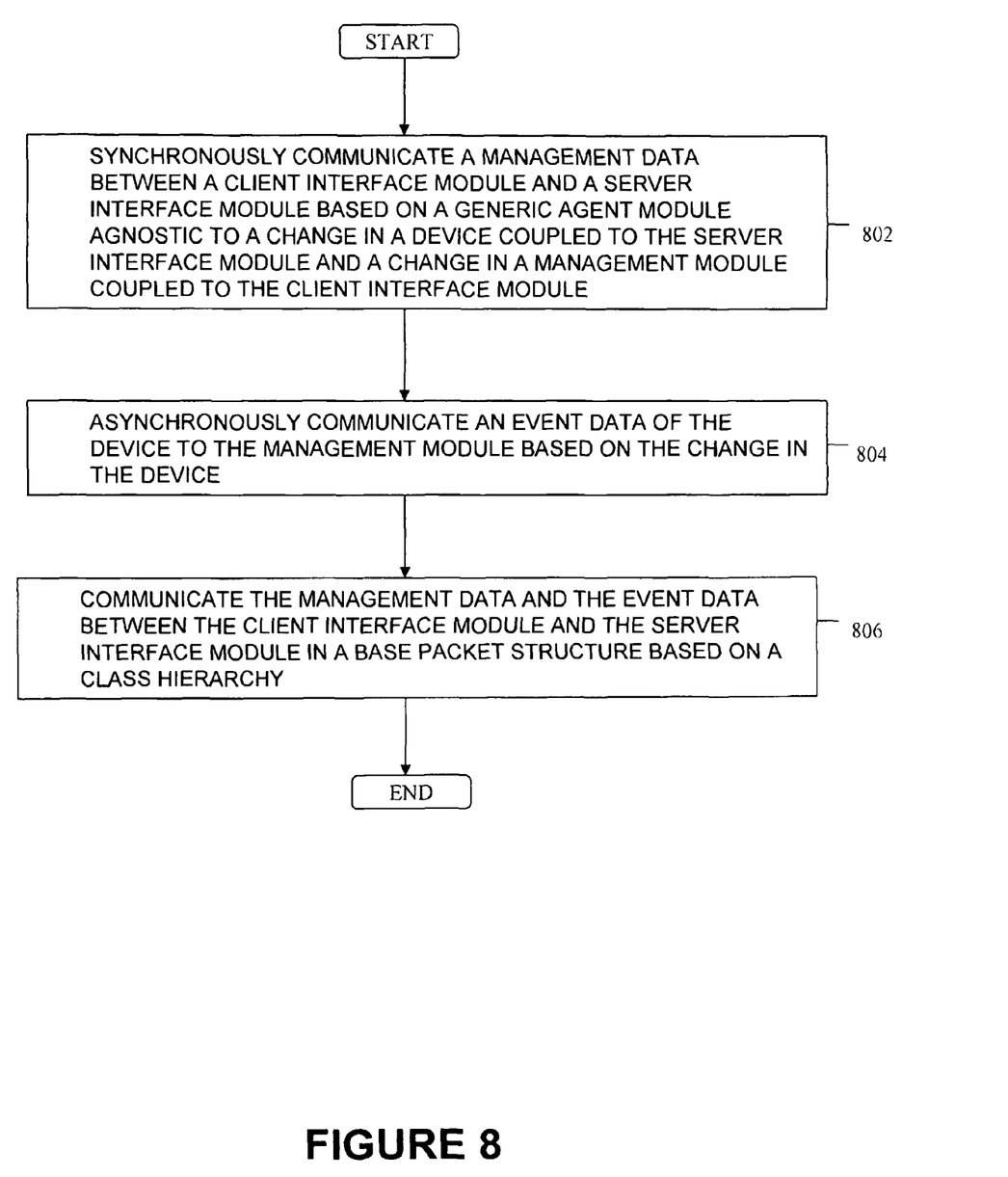
FIG. 8 is a process flow of communicating a management data of the management module of FIG. 1 and an event data of a device, according to one embodiment.

FIG. 8 is a process flow of communicating a management data (e.g., a request data 406 and/or the response data 408 of FIG. 4) and an event data (e.g., the event data 410) of a device (e.g., the device 110 of FIG. 1), according to one embodiment. In operation 802, the management data may be synchronously communicated between a client interface module (e.g., the client interface module 102 of FIG. 1) and a server interface module (e.g., the server interface module 106 of FIG. 1) based on a generic agent module (e.g., the generic agent module 108 of FIG. 1) agnostic to a change in a device (e.g., the device 110) coupled to the server interface module and a change in a management module (e.g., the management module 104 of FIG. 1) coupled to the client interface module.

In operation 804, an event data (e.g., the event data 410 of FIG. 4) of the device may be asynchronously communicated to the management module based on the change in the device. In operation 806, the management data and the event data may be communicated between the client interface module and the server interface module in a base packet structure based on a class hierarchy.

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein. It will be appreciated that the various embodiments discussed herein may/may not be the same embodiment, and may be grouped into various other embodiments not explicitly disclosed herein.

For example, the client interface module 102, the management module 104, the server interface module 106, and/or the generic agent module 108 of FIG. 1, the SNMP management module 204A, the CIM management module 204B, the CMPI management module 204N, the generic SNMP agent module 206A, the generic CIM agent module 206B, and/or the generic CMPI agent module 206N of FIG. 2, the broker module 302, the configuration module 304, the SNMP adapter module 308A, the CIM adapter module 308B, the CMPI adapter module 308N, the SNMP service adapter module 310A, the CIM service adapter module 310B, the CMPI service adapter module 310N, and/or the data collector module 312 of FIG. 3 and/or other modules of FIG. 1 through FIG. 8 may be embodied through a client interface circuit, a management circuit, a server interface circuit, a generic agent circuit, a SNMP management circuit, a CIM management circuit, a CMPI management circuit, a generic SNMP agent circuit, a generic CIM agent circuit, a generic CMPI agent circuit, a broker circuit, a configuration circuit, a SNMP adapter circuit, a CIM adapter circuit, a CMPI adapter circuit, a SNMP service adapter circuit, a CIM service adapter circuit, a CMPI service adapter circuit, a data collector circuit and/or other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of a hardware interface framework, comprising:
processing a management data associated with a management module of the hardware interface framework through a client interface module using a generic agent module, the processing being agnostic to a change in a device coupled to the hardware interface framework and a change in the management module of the hardware interface framework, the device being accessed through a server interface module using layered adapter modules corresponding to the generic agent module based on the management data, the agnosticism to the change in the device and the management module being effected based on a class hierarchy, and the management data being at least one of a request data of the management module, a response data of the device and an event data of the device;

communicating the management data of the management module between the client interface module and the server interface module coupled to the device using the generic agent module;

synchronously communicating the request data of the management module to collect the response data of the device, wherein the request data and the response data are communicated between the client interface module and the server interface module in a base packet structure based on the class hierarchy;

routing the request data to the layered adapter modules using a broker module which finds the layered adapter modules based on an interface map of the hardware interface framework;

instantiating a service adapter module defined in a configuration module of the hardware interface framework when the request data is processed through the service adapter module, the instantiation being based on matching a particular communication protocol of the request data to the service adapter module; and decoding the request data to forward to the service adapter module.

2. The method of claim 1, wherein the generic agent module includes at least a generic simple network management protocol (SNMP) agent module, a generic common information model (CIM) agent module, and a generic common management provider interface (CMPI) agent module.

3. The method of claim 1, wherein the management module includes at least a SNMP management module, a CIM management module, and a CMPI management module.

4. The method of claim 1, wherein the generic agent module resides in a repository of the hardware interface framework.

5. The method of claim 1, further comprising:
processing the request data through the service adapter module; and
loading a data collector module using a data collector loader module based on the request data.

6. The method of claim 5, further comprising collecting the response data of the device using the data collector module.

7. The method of claim 1, further comprising generating the event data based on the change in the device using the service adapter module which bases the interface map to communicate the event data to the layered adapter module.

8. The method of claim 1, further comprising asynchronously communicating the event data of an adapter module to the management module, wherein the event data is communicated between the client interface module and the server interface module in the base packet structure based on the class hierarchy.

9. A method of a hardware interface framework, comprising:
synchronously communicating a management data between a client interface module and a server interface module based on a generic agent module agnostic to a change in a device coupled to the server interface module and a change in a management module coupled to the client interface module, the agnosticism to the change in the device and the management module being effected based on a class hierarchy, the device being accessed through the server interface module using layered adapter modules corresponding to the generic agent module based on the management data, and the management data being at least one of a request data of the management module, a response data of the device and an event data of the device;

asynchronously communicating the event data of the device to the management module based on the change in the device;

synchronously communicating the request data of the management module to collect the response data of the device, wherein the request data and the response data are communicated between the client interface module and the server interface module in a base packet structure based on the class hierarchy;

routing the request data to the layered adapter modules using a broker module which finds the layered adapter modules based on an interface map of the hardware interface framework;

instantiating a service adapter module defined in a configuration module of the hardware interface framework when the request data is processed through the service adapter module, the instantiation being based on matching a particular communication protocol of the request data to the service adapter module; and decoding the request data to forward to the service adapter module.

10. The method of claim 9, further comprising performing the communicating the management data and the communicating the event data in the base packet structure based on the class hierarchy.

11. A system of a hardware interface framework, comprising:

a processor;

a client interface module to process a management data of a management module using a generic agent module associated therewith, the generic agent module of the client interface module being agnostic to a change in a device coupled to the hardware interface framework and a change in a management module of the hardware interface framework, and the agnosticism to the change in the device and the management module being based on a class hierarchy; and a server interface module to access the device using layered adapter modules corresponding to the generic agent module based on the management data using the processor, wherein the management data includes at least one of a request data of the management module, a response data of the device, and an event data of the device, wherein the request data of the management module is synchronously communicated to collect the response data of the device, the request data and the response data being communicated between the client interface module and the server interface module in a base packet structure based on the class hierarchy, wherein the request data is routed to the layered adapter modules using a broker module which finds the layered adapter modules based on an interface map of the hardware interface framework, wherein a service adapter module defined in a configuration module of the hardware interface framework is instantiated when the request data is processed through the service adapter module, the instantiation being based on matching a particular communication protocol of the request data to the service adapter module, and wherein the request data is decoded to be forwarded to the service adapter module.

12. The system of claim 11, wherein the service adapter module is configured to fetch the response data from at least one of a data collector module and a different service adapter module.

13. The system of claim 12, further comprising a data collector loader module to load the data collector module only if the data collector module has not already been loaded.

* * * * *